United States Patent
Ding et al.

(10) Patent No.: US 11,617,374 B2
(45) Date of Patent: Apr. 4, 2023

(54) METHOD OF GREEN AND SAFE PRESERVATION FOR AQUATIC PRODUCTS AT SEA

(71) Applicant: Zhejiang University of Technology, Hangzhou (CN)

(72) Inventors: Yuting Ding, Hangzhou (CN); Shulai Liu, Hangzhou (CN); Xuxia Zhou, Hangzhou (CN); Jianhua Liu, Hangzhou (CN); Fei Lv, Hangzhou (CN); Jianyou Zhang, Hangzhou (CN); Yanbo Wang, Hangzhou (CN); Zhenyu Zhang, Hangzhou (CN)

(73) Assignee: ZHEJIANG UNIVERSITY OF TECHNOLOGY, Hangzhou (CN)

( * ) Notice: Subject to any disclaimer, the term of this patent is extended or adjusted under 35 U.S.C. 154(b) by 836 days.

(21) Appl. No.: 16/452,508

(22) Filed: Jun. 25, 2019

(65) Prior Publication Data
US 2019/0387760 A1   Dec. 26, 2019

(30) Foreign Application Priority Data
Jun. 25, 2018 (CN) .......................... 201810664878.3

(51) Int. Cl.
A23B 4/09   (2006.01)
A23B 4/20   (2006.01)
B63J 2/14   (2006.01)

(52) U.S. Cl.
CPC ................. *A23B 4/09* (2013.01); *A23B 4/20* (2013.01); *B63J 2/14* (2013.01); *A23V 2002/00* (2013.01)

(58) Field of Classification Search
CPC ..... A23B 4/09; A23B 4/20; A23B 4/24; B63J 2/14; B63J 99/00; A23V 2002/00; A23L 3/3472; A23L 3/3481; C09K 5/20
See application file for complete search history.

(56) References Cited

U.S. PATENT DOCUMENTS

| | | | | |
|---|---|---|---|---|
| 4,968,520 A | * | 11/1990 | Wang | A23B 4/066 426/524 |
| 2009/0054626 A1 | * | 2/2009 | Chiba | A23L 3/3526 530/422 |
| 2011/0039699 A1 | * | 2/2011 | Moratiel Yugueros | C09K 3/18 504/118 |
| 2017/0295777 A1 | * | 10/2017 | Wei | C09K 3/18 |

FOREIGN PATENT DOCUMENTS

| | | |
|---|---|---|
| CN | 102009740 A | 4/2011 |
| CN | 102241964 A | 11/2011 |
| CN | 103087683 A | 5/2013 |
| CN | 103689061 A | 4/2014 |
| CN | 104839312 A | 8/2015 |
| CN | 105660816 A | 6/2016 |

OTHER PUBLICATIONS

Translation of Ding_CN 102009740A (Year: 2010).*
Ma et al., "Thermal Hysteresis Activity of Antifreeze Protein from Antarctic Krill (Euphausia superba) by Differential Scanning Calorimetry Evaluation", Jun. 15, 2018, Food Science, vol. 39, issue 11; Google translation relied on for citations (Year: 2018).*
Translation of Ma_ Thermal Hysteresis Activity of Antifreeze Protein from Antarctic Krill (Year: 2018).*
("Glycerol", 2009, Openwetware.org, https://openwetware.org/wiki/Glycerol (Year: 2009).*
Ethyl Alcohol, 2017, Louisiana State University (LSU), https://web.archive.org/web/20171226123940/http://macro.lsu.edu:80/HowTo/solvents/ethanol.htm (Year: 2017).*
Yanan et al., "Effect of eel head protein hydrolysates on the denaturation of grass carp surimi during frozen storage", 2012, Procedia Engineering, vol. 27, pp. 223-228 (Year: 2012).*

* cited by examiner

*Primary Examiner* — Jeffrey P Mornhinweg
*Assistant Examiner* — Kelly P Kershaw
(74) *Attorney, Agent, or Firm* — Bayramoglu Law Offices LLC (57) ABSTRACT

A method for preserving aquatic products at sea includes the following steps: an on-board refrigeration system is used to refrigerate the antifreeze solution, and the antifreeze solution is used as a main cold source, and temperatures at centers of fish bodies drop rapidly to achieve rapid cooling and reduce activity of endogenous enzymes and inhibit proliferation of microorganisms by direct or indirect heat exchange with captured catches. The antifreeze solution contains edible alcohol, propylene glycol, glycerol, calcium chloride, sodium chloride, amino acids, Antarctic krill protein hydrolysate with average molecular weight of 50-100 KDa, surfactant and water, and the mass percentage of each component is as follows: edible alcohol 15%-30%, propylene glycol 10%-30%, glycerol 2%-15%, calcium chloride 1%-10%, sodium chloride 3%-10%, amino acid 0.1%-0.15%, Antarctic krill protein hydrolysate 0.01%-0.3%, surfactant 0.005%-0.5%, and the balance is water.

9 Claims, 5 Drawing Sheets

METHOD OF GREEN AND SAFE PRESERVATION FOR AQUATIC PRODUCTS AT SEA

CROSS-REFERENCE TO RELATED APPLICATIONS

This Non-provisional application claims priority under 35 U.S.C. § 119(a) on Chinese Patent Application No(s). 201810664878.3 filed on Jun. 25, 2018, the entire contents of which are hereby incorporated by reference.

BACKGROUND OF THE INVENTION

Field of the Invention

The invention relates to a safe preservation technology for aquatic products at sea, in particular to a method of green and safe preservation for aquatic products on a ship without ammonia fluoride evaporation cold cabin.

Description of the Related Art

After the fish and other aquatic products are captured and killed, there are still complex biochemical reactions in the body. This is mainly due to the endogenous proteases present in the fish and the microorganisms attached to the fish, resulting in a continuous decline in the quality of aquatic products. The actions of microorganisms and enzymes are inhibited in a low temperature environment, and the rate of chemical reactions such as oxidation significantly slowed down, so that the freshness of aquatic products can be maintained for a long time without causing spoilage. This is how the cryopreservation of aquatic products works.

At present, the cold cabin of fishing vessels for transporting aquatic products in China usually adopts ammonia refrigeration mode, which often causes leakage of ammonia. It is not only the refrigeration temperature cannot be guaranteed, but also the quality of fish products is seriously deteriorated. Serious pollution of frozen fish products may even result in food safety and fire accidents. The other refrigeration mode is the use of Freon. Because there isn't a good cooling method, this refrigerant that is completely banned in China in 2010 is still in use, and the alternatives of Freon also have the same problems of toxicant leakage and being flammable. The cabins filled with frozen aquatic products also do not prevent gas leakage and meet the requirements of explosion-proof ventilation systems and equipment. In addition, Freon and its alternatives are liable to cause "ice blockage" in cryogenic systems, and it's unable to solve the problems such as blockage of throttle valves or pipes.

At present, the method of cooling preservation can also be adopted to the fish preservation at home and abroad. In China, the flake ice is mainly used to directly cool the fish body, that is, the temperature of the fish body is lowered as close as possible to the freezing point of the fish body solution, thereby reducing the activities of enzymes and microorganisms. In this way, the fish body maintains good freshness for a certain period of time. However, the flake ice is easy to cause mechanical damage on the surface of the fish body, and the solution loss of the aquatic products is large after thawing. The Chinese patent CN201010524850.3 uses cold saline water to cool and preserve the captured aquatic products, which has the characteristics of low cost and good economy, but the high concentration of saline water has a serious corrosion to the equipment, which is not conducive to long-term operation. Chinese patent CN201511031472.4 relates to a cold seawater fresh-keeping method for mackerel on board, which includes the following steps: firstly, the captured fresh mackerel is frozen with flake ice; secondly, during the initial stiff period of the fish, the surface of the fish body is sprayed with a preservative or the fish body is immersed in the preservative solution; thirdly, the fish body is dried using the cold air to form a uniform and dense protective film on the surface; fourthly, the fish body is immersed into the cold seawater with the temperature from −2° C. to 0° C., and pH 4 to 5.5, with the purpose of preserving the caught mackerel. The method is cumbersome, and the flake ice is easy to cause mechanical damage to the fish skin and reduce the quality of the aquatic products. Chinese patent CN104839312A discloses a method for preserving pelagic fishes on board at sea. The surface of fish and the fish gill after caught is cleaned using the clean seawater, and then the fish is put into the cold seawater at −1° C. to 0° C. The soaking is carried out to realize the rapid cooling treatment of the fish body, and then the obtained fish is rapidly frozen in the freezing chamber at −22 to −24° C. for 5 to 7 hours, and finally frozen-stored with the ice glazing. The method of preserving seafood is cumbersome, and the operation is laborious with a low level of mechanization. It is difficult for large-scale operations, especially for the seine operation of catching pelagic fishes (15 to 20 tons production per net). In addition, it's difficult to reduce the temperature to freezing point for all fishes, resulting in a decline in the quality of aquatic products.

BRIEF SUMMARY OF THE INVENTION

In order to solve the existing problems that aquatic product preservation technology being not applied to the on-board operation, the huge energy consumption, the high cost, and the poor preservation quality, the present invention provides a method for preserving aquatic products with effective application to large-scale operation on board, low energy consumption, low cost, no ammonia fluoride evaporation, green and safety, and good quality of aquatic products.

The technology adopted by the present invention is as follows:

A method for preserving aquatic products at sea includes the following steps: using an on-board refrigeration system to refrigerate an antifreeze solution, wherein the antifreeze solution is used as a main cold source, temperatures at centers of fish bodies drop rapidly to achieve rapid cooling and reduce activity of endogenous enzymes and inhibit proliferation of microorganisms by direct or indirect heat exchange with captured catches.

The antifreeze solution includes edible alcohol, propylene glycol, glycerin, calcium chloride, sodium chloride, amino acid, Antarctic krill protein hydrolysate with an average molecular weight of 50-100 KDa, surfactant and water, the surfactant is one or mixture of phospholipid, polysorbate-20, polysorbate-60, and polysorbate-80, each component of the antifreeze solution is food grade, and the mass percentage of each component is as follows:

| | |
|---|---|
| Edible alcohol | 15-30% |
| Propylene glycol | 10-30% |
| Glycerol | 2-15% |
| Calcium chloride | 1-10% |
| Sodium chloride | 3-10% |

-continued

| | |
|---|---|
| Amino acids | 0.1-0.15% |
| Antarctic krill protein hydrolysate | 0.01-0.3% |
| Surfactant | 0.005-0.5% |
| Water | margin |

Further, the mass percentage of propylene glycol is preferably from 10% to 20%.

Further, the mass percentage of glycerin is preferably from 2% to 5%.

Further, the mass percentage of calcium chloride is preferably from 1% to 5%.

Further, the Antarctic krill protein hydrolysate is based on Antarctic krill. Firstly, papain (Nanning Pangbo Biological Engineering Co., Ltd., enzyme activity 1 million U/g) is used to obtain an Antarctic krill crude protein hydrolysate solution. Then, the solution is sequentially passing through an ultrafiltration membrane with membrane pore molecular weight of 100 KDa to 50 KDa to obtain a protein hydrolysate with an average molecular weight of 50 KDa to 100 KDa.

The krill protein hydrolysate of 50-100 KDa has an anti-crystallization effect at low temperature, and can inhibit the production of frozen nucleus of cryopreservation solution at low temperature.

Further, the enzymatic hydrolysis conditions are as follows: temperature 40° C., pH 6.5, time 3 h, enzyme amount (E/S) 1000 U/g protein.

Further, the amino acid is selected from one or a combination of any one of the following: glycine, alanine, and arginine.

Further, the water is tap water, distilled water, purified water and so on.

Further, the antifreeze solution is composed of edible alcohol, propylene glycol, glycerin, calcium chloride, sodium chloride, amino acids, Antarctic krill protein hydrolysate with an average molecular weight of 50 KDa to 100 KDa, surfactant, and water.

The preparation of antifreeze solution according to the present invention is as follows: firstly, salt, amino acid substance and surfactant are dissolved in water. Then the edible alcohol, propylene glycol, glycerin and Antarctic krill protein hydrolysate are added and stirred well to be used.

Preferably, the method for preserving aquatic products at sea adopts first device, which includes a cold storage tank, a cooling tank, an on-board refrigeration house, a heat exchanger and an on-board refrigeration system. The cold storage tank wall and the refrigeration house wall are provided with coils. A circulation line is formed between the on-board refrigeration system and the coil of the cold storage tank through a pipeline. The cold storage tank forms a self-circulation pipeline 1 controlled by a valve and a circulation pump through a pipeline. The refrigeration house circulation pipe 2 controlled by a valve and a circulation pump is formed between the coil of the reservoir and the cold storage tank. The circulation line controlled by the circulation pump is formed between the first cold storage tank and the heat exchanger through a pipe. The circulation tank and the heat exchanger form a valve and a circulation pump controlled circulation line 4 through a pipeline. The cold storage tank is further provided with an antifreeze solution charging port and an antifreeze solution discharging port. The cooling tank is further provided with seawater charging port and seawater discharging port.

The method includes the following steps:

(1) About 50%-80% of antifreeze solution is added to the cold storage tank. The on-board refrigeration system is started. The valve is opened to connect its own circulation line 1. The circulation pump is started to make the antifreeze solution flow in the cold storage tank. Through the cold storage tank, the coil is exchanged with the on-board refrigeration system for cooling, so that the temperature of the antifreeze solution in the cold storage tank is kept at −45° C. to −10° C. Then the self-circulation line 1 is disconnected.

(2) The cooling tank is added with seawater. The salt content in seawater is adjusted according to the empirical formula and the required temperature of cold seawater. The empirical formula is as follows: $T=-0.0636 \times C$, where T represents the required temperature of cold seawater, and the unit is ° C.; C represents the salt content in seawater, the unit is g/L (for example, the salt content of seawater is 35 g/L, and the freezing point is −2.23° C. If the freezing point is −10° C., the salt content of the solution is about 157 g/L). The valve is opened and the circulation pump is started while connecting the circulation line 3 and 4, so that the seawater in the cooling tank and the antifreeze solution in the cold storage tank pass through the heat exchanger for cooling. The temperature of the seawater in the cooling tank is reduced to 0° C. to −10° C. The captured catches are transferred into the cooling tank and contact the cold seawater at 0° C. to get cooled quickly. The required cooling temperature is obtained when the center temperature is dropped to −5° C. to 5° C. During the cooling process, the connection of the circulation line 3 and 4 is kept to provide cooling for fish.

(3) After the cooling is completed, the circulation line 3 and 4 are disconnected, and the seawater in the cooling tank is discharged through the seawater discharging port. At the same time, the valve is opened to connect the circulation line 2, and the circulation pump is started to make the temperature of the refrigeration house is lowered and kept at 0° C. to −10° C. After the seawater in the cooling tank is drained, the fish is transferred to a refrigeration house to maintain its freshness.

Further, the circulation lines 1 and 2 are connected b a triangular valve through the connection line flowing from the cold storage tank to the refrigeration house, and the two share a valve and a circulation pump.

Further, a filter is further equipped between the cooling tank and the heat exchanger, and the arrangement style is in the following steps: a valve, filter and circulation pump are sequentially arranged in the pipeline of the flow direction from the cooling tank to the heat exchanger, to retain the capture and cooling. This can prevent impurities going through the circulation pump and heat exchanger, to cause the pipeline blockage.

Further, the antifreeze solution in the cold storage tank is added to the cold storage tank through the antifreeze solution charging port, and the antifreeze solution in cold storage tank is discharged from the antifreeze solution discharging port.

Further, the temperature of the refrigeration house is adjusted by the change of the output power of the circulation pump. When the flow rate of the antifreeze solution increases, the amount of cooling capacity inputting into the refrigeration house increases and vice versa. This makes the temperature of the refrigeration house is kept at 0° C. to −10° C.

Preferably, the method for preserving aquatic products at sea adopts a second device, which includes a first cold storage tank, a second cold storage tank, a cabin and an on-board refrigeration system. The wall of the first cold storage tank and the cabin are equipped with a coil. A circulation line is formed between the on-board refrigeration system and the coil of the first cold storage tank through a pipe, and a circulation line 5 formed by a circulation pipe controlled by the valve and the circulation pump between the first cold storage tank and tank B. A circulation line 6 controlled by a valve and a circulation pump is formed through a pipeline between the first cold storage tank and the coil of the cabin, and the second first cold storage tank and the cabin form a communication line 7 by a valve and a circulation pump. A self-circulation line 8 of the cabin is controlled by a circulation pump with pipe. The first cold storage tank is equipped with an antifreeze solution discharging port, and the second cold storage tank is equipped with an antifreeze solution charging port. The cabin is equipped with a cooling solution discharging port.

The method includes the following steps:

(1) The antifreeze solution is added to the second cold storage tank. The on-board refrigeration system is started, and the valve connection circulation line 5 is opened, so that the antifreeze solution is in a flowing state between the first cold storage tank and tank B. The cooling exchange occurred between the coil in the first cold storage tank and the on-board refrigeration system, and the temperature of antifreeze solution in the first cold storage tank and tank B is decreased and kept at −45° C. to −18° C.

(2) The newly caught fish is put in the cabin. The valve connection circulation line 6 is opened, circulation pump is started to make the antifreeze solution in the first cold storage tank go into the coil in the cabin. At the same time, the valve is opened to make the communication line 7 communicating, so that the antifreeze solution in the second cold storage tank is added to the cabin. The antifreeze solution contacts with the fish indirectly. After the antifreeze solution submerges the fish, the circulation pump is turned off to disconnect the communication line 7, and then the circulation pump is started to connect the circulation tube 8. The flowing antifreeze solution allows the fish body to be rapidly cooled to a central temperature of −15° C. to −25° C. to reach the frozen requirements. After the cooling is completed, the antifreeze solution in the cabin is discharged through the cooling solution discharging port. The fish is still stored in the cabin. The circulation line 6 between the first cold storage tank and the cabin coil is kept in a circulating state, so that the temperature in the cabin is kept at −45° C. to −18° C. to reach the frozen storage conditions.

Further, in the circulation line 5, the connection line flowing from the first cold storage tank to the second cold storage tank, and the connection line flowing from the first cold storage tank to the cabin in the circulation line 6 are connected by a triangular valve, and the two share both of the valve and the circulation pump.

Further, in the circulation line 5, the connection line flowing from the second cold storage tank to tank A and the communication line 7 are connected by a triangular valve, and the two share both of the valve and the circulation pump.

Further, in the self-circulation line 8, a filter is arranged between the circulation pump and the cabin, and the solution in the pipeline flows from the circulation pump to the filter, to intercept the fish scales, broken fish skin, fin fragments and impurities which are produced during the cooling process. This prevents impurities going into the circulation pump and blocking the pipeline.

Further, after the antifreeze solution is reduced, the antifreeze solution can be replenished into the second cold storage tank through the antifreeze solution charging port.

Further, the temperature in the cabin is adjusted by the change of the output power of the circulation pump. When the flow rate of the antifreeze solution increases, the amount of cooling capacity inputting into the refrigeration house increases and vice versa. After the antifreeze solution is discharged out of the cabin, preferably the cabin temperature is kept at −18° C. to −25° C.

The above technology uses the cabin as a refrigeration house after the cooling is completed, which greatly reduces the working intensity of the fish transportation, and effectively reduces the damage rate of the fish (to 1%-5%). This makes the fish store in the cabin and maintains fish high freshness for a long time.

Preferably, the method for preserving aquatic products at sea adopts a third device, which includes a cold storage tank, a plate freezer, a refrigeration house and an on-board refrigeration system. The wall of the first cold storage tank and the refrigeration house are both equipped with a coil. A circulation line is formed between the on-board refrigeration system and the coil of the cold storage tank through a pipeline. The cold storage tank forms a self-circulation pipeline 9 controlled by a valve and a circulation pump through a pipeline. A circulation pipe 10 controlled by a valve and a circulation pump is formed between the refrigeration house coil and the cold storage tank. A circulation pipe 11 controlled by a circulation pump is formed between the first cold storage tank and the plate freezing machine through a pipe. The tank is also provided with an antifreeze charging port and an antifreeze discharging port.

The method includes the following steps;

(1) antifreeze solution is added into the cold storage tank, the on-board refrigeration system is started, and the valve is opened to make the first circulation line communicating, the first circulation pump is started to make the antifreeze solution in the cold storage tank in a flowing state, the cold exchange is carried out through the coil and the on-board refrigeration system, so that a temperature of the antifreeze solution in the cold storage tank is kept at −45° C. to −20° C., and then the self-circulation line is disconnected (2) the captured catches are put into the plate freezer, the valve is opened to make the second circulation line communicating, and the second circulation pump is started to make the low temperature antifreeze solution go into an interlayer of the plate freezer plate for indirect heat exchange, the high-temperature antifreeze solution after heat exchange flows out of the plate freezer from the side of the interlayer and returns to the cold storage tank, at the same time, the captured catches in the plate freezer are rapidly frozen, making the temperatures of the centers of the fish bodies to be at −10° C. to −18° C. thus to meet a cooling requirement;

(3) after the plate freezing is finished, the second circulation line is disconnected, at the same time, the first valve is opened to communicate the first circulation line, and the first circulation pump is started to make the low-temperature antifreeze solution flow into the coil of the wall of the refrigeration house, so that the temperature of the refrigeration house is lowered and kept below −18° C., and the captured catches are then transferred from the plate freezer to a refrigeration house to maintain freshness.

Further, the circulation line 9 and 10 are connected by a triangular valve through the connection line flowing from the cold storage tank to the refrigeration house, and the two share a valve and a circulation pump.

Further, the plate freezer is a vertical or horizontal plate freezer.

Further, the indirect heat exchange in the plate freezer can control the freezing rate of the catches by adjusting the flow rate of the antifreeze solution by the circulation pump.

Further, the antifreeze solution in the cold storage tank is added to the cold storage tank through the antifreeze solution charging port, and the antifreeze solution in cold storage tank is discharged from the antifreeze solution discharging port.

Further, the temperature of the refrigeration house is adjusted by the change of the output power of the circulation pump. When the flow rate of the antifreeze solution increases, the amount of cooling capacity inputting into the refrigeration house increases and vice versa.

In the present invention, the circulation pipe is composed of a connection pipe that flows from the first device to the second device, and a connection pipe that flows from the second device to the first device, so as to realize the circulation of the solution between the first device and the second device. If the first device and the second device are the same, the equipment forms its own circulation pipeline.

The beneficial effects of the invention are:

(1) The antifreeze solution formulation used in the present invention completely adopts components which do not cause any harm to human health and satisfies food safety requirements. The reduction in the content of sodium chloride or calcium chloride of antifreeze solution causes no corrosion to the equipment, and the replacement of ethylene glycol used in the industry by propylene glycol makes the antifreeze solution more green. The present invention adds a small amount of 50-100 KDa Antarctic krill protein hydrolysate, which not only reduces the freezing point of the solution, but also improves heat transfer efficiency, and the crystallization of the antifreeze solution during the stirring process is suppressed as well. The addition of a small amount of the surfactant in the present invention can effectively reduce the volatility of the alcoholic substances in the components of the antifreeze solution through the van der Waals force and the hydrogen bond between the surfactant and the alcohol substances. This makes the antifreeze solution system more stable. The minimum freezing point of the antifreeze solution of the present invention can reach below −45° C., with the moderate viscosity, the less volatilization, and the stable performance, and different ratios can be selected according to the required temperature.

(2) The present invention uses the antifreeze solution as the main cold source instead of the previous ammonia fluoride refrigeration, which is greener, safer and has better refrigeration effect. What's more, the antifreeze solution has high heat transfer efficiency, so that the preservation effect of the aquatic products is better.

(3) The present invention uses the antifreeze solution as a cooling source, instead of using the flake ice to cool down, which reduces the energy consumption of direct cooling, and reduces the fishing cost of the fishermen. The antifreeze solution can be mechanically cooled using the excessive power or electric energy of the ship itself, and the low-temperature antifreeze solution in the cold storage tank can be prepared before reaching the fishing grounds.

(4) The antifreeze solution of the present invention directly or indirectly preserves aquatic products at sea, which has no mechanical damage to the aquatic products. On the one hand, the appearance and color of the caught aquatic products are closer to the original quality, and on the other hand, the microorganisms on the surface of the fish are prevented from going into the body.

(5) The antifreeze solution of the cold storage tank of the present invention has a low freezing point and a large cold storage capacity for one time. It can be used for the preservation of aquatic products at sea with a large fishing amount, and can simultaneously provide a cold source for a plenty of systems on the ship.

(6) Compared with the use of flake ice, glazing and so on, the present invention has a higher degree of mechanization, greatly reduces labor intensity, and facilitates the use of a fish suction pump to load and unload the fish.

DETAILED DESCRIPTION OF THE INVENTION

The present invention will be further described below in combination with accompanied drawings and embodiments.

Figure 4:
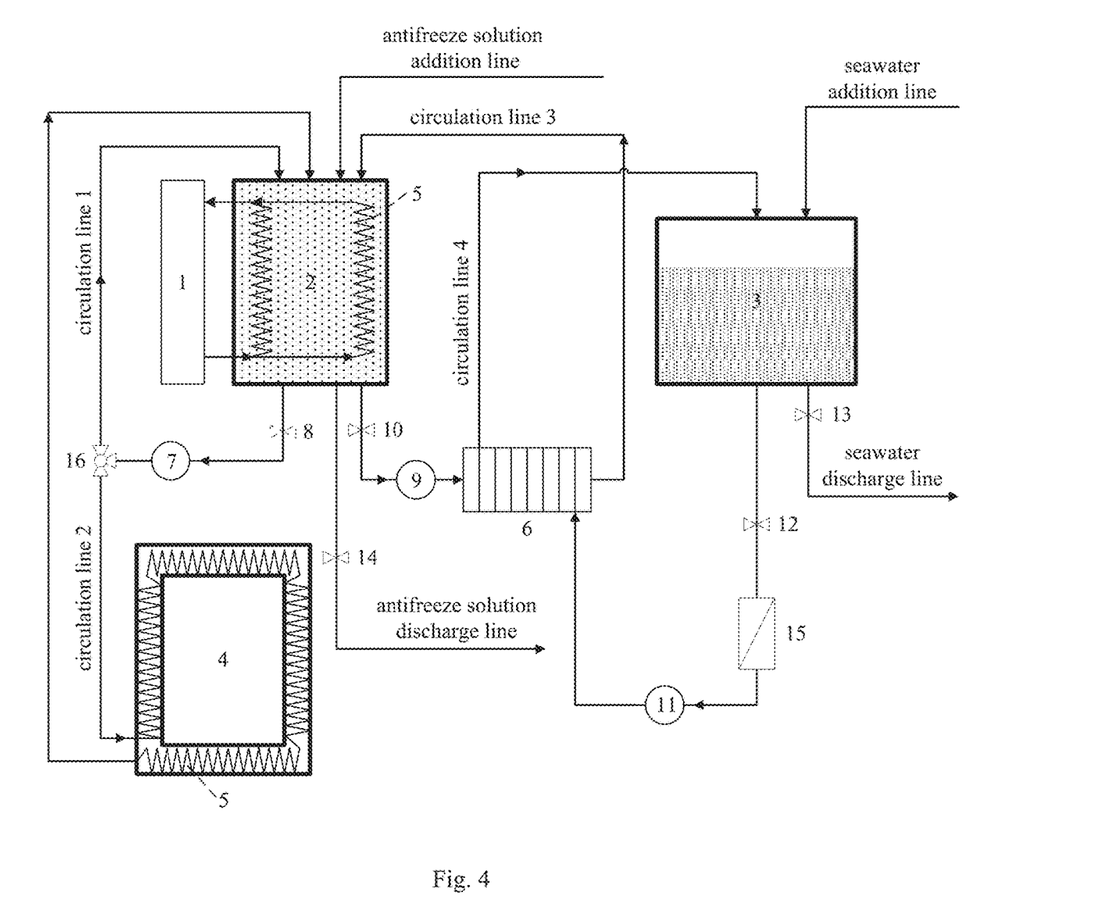
FIG. 4 is a schematic diagram of a first device according to one of embodiments of the present invention, wherein 1 is an on-board refrigeration system; 2 is a cold storage tank; 3 is a cooling tank; 4 is a refrigeration house; 5 is a coil; 6 is a heat exchanger; 7, 9, and 11 are circulation pumps; 8, 10; 12, 13, and 14 are valves; 15 is a filter; 16 is a three-way valve.

As shown in FIG. 4, the first device includes a cold storage tank 2, a cooling tank 3, an on-board refrigeration house 4, a heat exchanger 6 and an on-board refrigeration system 1. The wall of the cold storage tank 2 and the wall of the refrigeration house 4 are provided with a coil 5, respectively. A circulation line is formed between the on-board refrigeration system 1 and the coil 5 of the cold storage tank 2 through a pipeline. A self-circulation line 1 controlled by a valve 8 and a circulation pump 7 is formed at the cold storage tank 2. A first circulation line 2 controlled by the valve 8 and circulation pump 7 is formed between the coil 5 of the refrigeration house 4 and the cold storage tank 2 through a pipeline. The self-circulation line 1 and the first circulation line 2 are connected by a three-way valve 16. A second circulation line 3 controlled by a valve 10 and a circulation pump 9 is formed between the cold storage tank 2 and the heat exchanger 6 through a pipeline. A third circulation line 4 controlled by a third valve 12 and a third circulation pump 11 is formed between the cooling tank 3 and the heat exchanger 6 through a pipeline. A filter 15 is arranged between the third valve 12 and the third circulation pump 11. The cold storage tank 2 is further equipped with an antifreeze solution charging port and an antifreeze solution discharging port, and the cooling tank is also equipped with a seawater charging port and a seawater discharging port.

Figure 5:
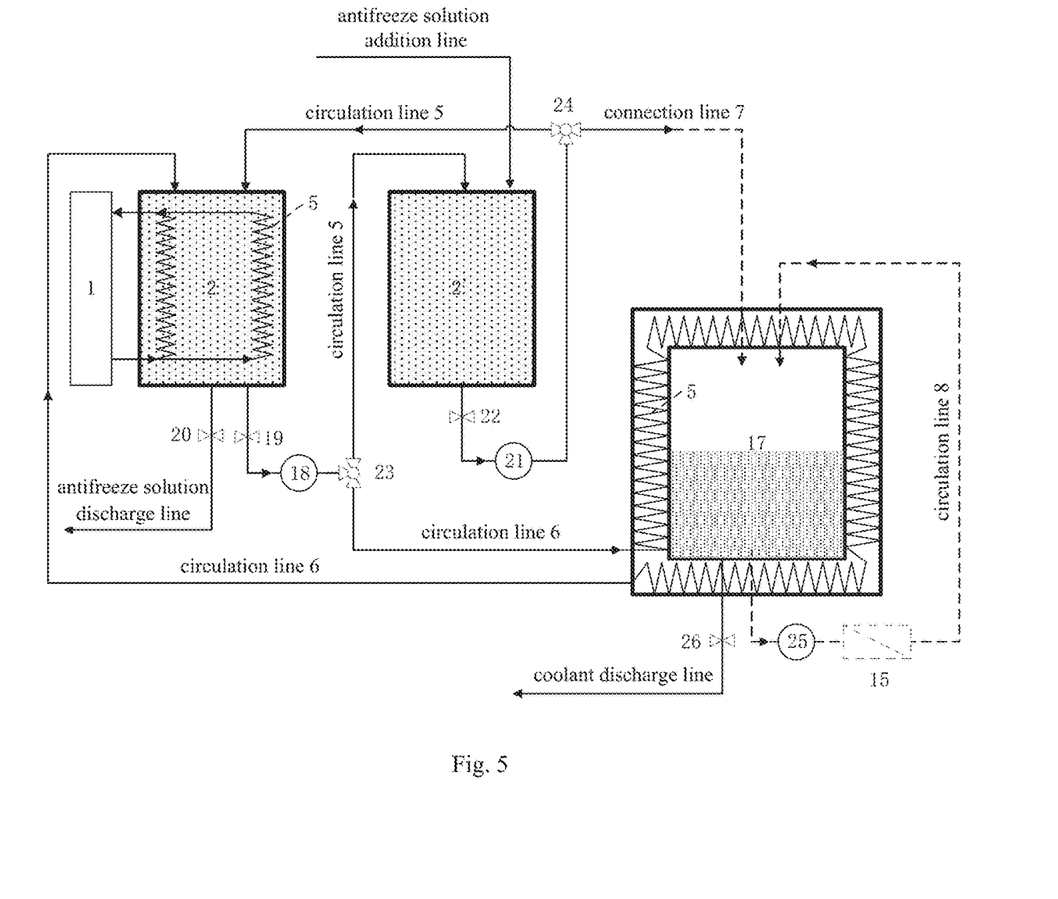
FIG. 5 is a schematic diagram of a second device according to another embodiment of the present invention, wherein 1 is an on-board refrigeration system; 2 is a first cold storage tank; 2' is a second cold storage tank; 5 is a coil; 17 is a cabin; 18, 21, and 25 are circulation pumps; 19, 20, 22, and 26 are valves; 15 is a filter; 23 and 24 are three-way valves.

As shown in 5, the second device includes a first cold storage tank 2, a second cold storage tank 2', a cabin 17, and an on-board refrigeration system 1. The wall of the first cold storage tank 2 and the wall of the cabin 17 are provided with a coil 5, respectively. A circulation line is formed between the on-board refrigeration system 1 and the coil 5 of the first cold storage tank 2 through a pipeline. A first circulation line 5 controlled by valves 19, 22 and circulation pumps 18, 21 is formed between the first cold storage tank 2 and the second cold storage tank 2' through a pipeline. A second circulation line 6 controlled by the first circulation pump 18 and the first valve 19 is formed between the first cold storage tank 2 and the coil 5 of the cabin 17 through a pipeline. A communication line of the first circulation line 5, flowing from the first cold storage tank 2 to the second cold storage tank 2', and a communication line of the second circulation line 6, flowing from the first cold storage tank 2 to the cabin 17, are connected by a triangular valve 23. The two lines share the common valve 19 and the common circulation pump 18. A communication line 7 is formed between the second cold storage tank 2' and the cabin 17 form through the second valve 22 and the second circulation pump 21. A communication line of the first circulation line 5, flowing from the second cold storage tank 2' to the first cold storage tank 2, and the communication line 7 are connected by a triangular valve 24. The two lines share the common valve 22 and the common circulation pump 21. A self-circulation line 8 controlled by a third circulation pump 25 is formed at the cabin 17 through a pipeline (a valve can be arranged as required). A filter 15 is arranged between the circulation pump 25 and the cabin 17, making the flow of solution in the pipeline to be from the circulation pump 25 to the filter 15. The first cold storage tank 2 is equipped with an antifreeze solution discharging port. The second cold storage tank 2' is equipped with an antifreeze solution charging port. The cabin 17 is equipped with a cooling solution discharging port.

Figure 6:
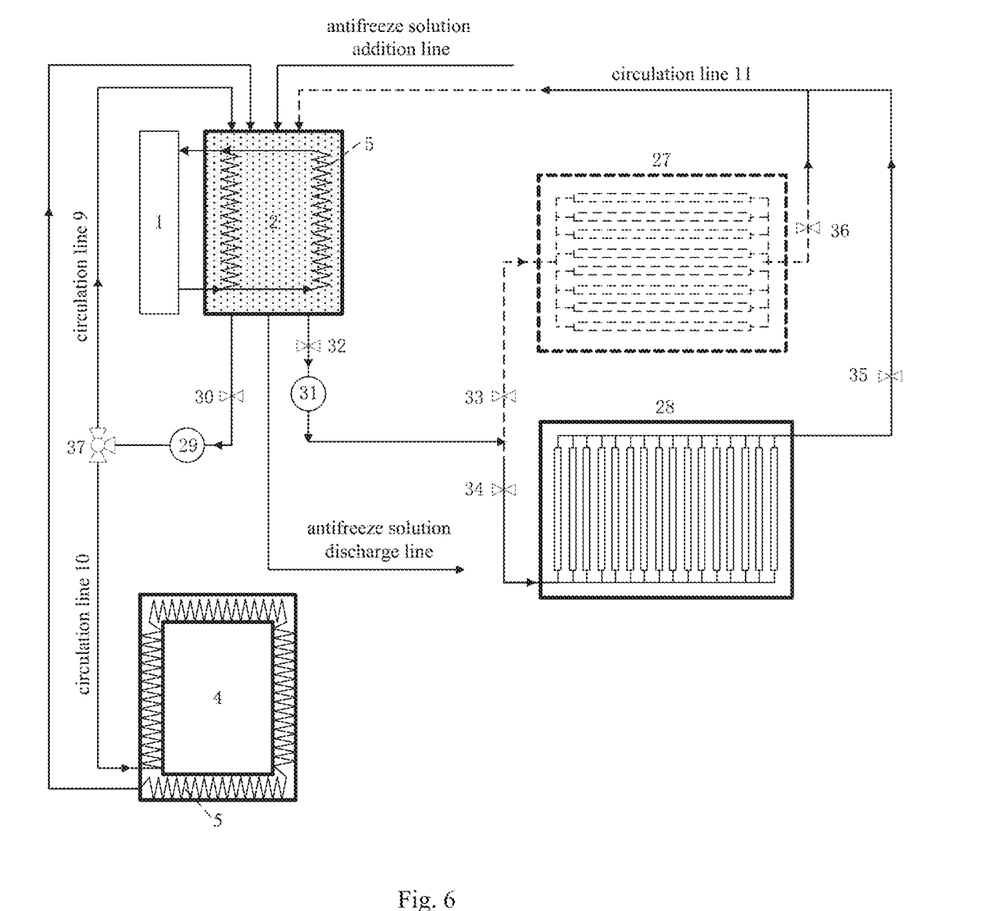
FIG. 6 is a schematic diagram of a third device according to another embodiment of the present invention, wherein 1 is an on-board refrigeration system; 2 is a cold storage tank; 4 is a refrigeration house; 5 is a coil; 27 is a horizontal plate freezer; 28 is a vertical plate freezer; 29 and 31 are cycle pumps; 30, 32, 33, 34, 35, and 36 are valves; 37 is a three-way valve.

As shown in FIG. 6, the third device includes a cold storage tank 2, a horizontal flat plate freezer 27, a vertical flat plate freezer 28, a refrigeration house 4, and an on-board refrigeration system 1. The wall of the cold storage tank 2 and the wall of the refrigeration house 4 are provided with a coil 5, respectively. A circulation line is formed between the on-board refrigeration system 1 and the coil 5 of the cold storage tank 2 through a pipeline. A self-circulation line 9 controlled by a valve 30 and a circulation pump 29 is formed at the cold storage tank 2. A circulation line 10 controlled by a valve 30 and a circulation pump 29 is formed between the coil 5 of the refrigeration house 4 and the cold storage tank 2 through a pipeline. The circulation line 9 and the circulation line 10 are connected by a three-way valve 37. A circulation line 11 controlled by valves 32, 33, 36 and a second circulation pump 31 is formed between the cold storage tank 2 and the horizontal flat plate freezer 27 through a pipeline. A circulation line 11 controlled by valves 32, 34, 35 and the second circulation pump 31 is formed between the cold storage tank 2 and the vertical plate freezer 28 through a pipeline. The cold storage tank is further equipped with an antifreeze solution charging port and an antifreeze solution discharging port.

The following examples use edible alcohol (95%), propylene glycol of food grade, glycerol of food grade, calcium chloride of food grade, edible sodium chloride, amino acids of food grade, Antarctic krill protein hydrolysate, surfactants of food grade and tap water as raw materials to prepare the antifreeze solution.

Example 1

Preparation of Antarctic Krill Protein Hydrolysate

An aliquot of 100 kg of Antarctic krill is used as raw material. Firstly, it is enzymatically hydrolyzed by papain. The amount of enzyme is 1000 U/g protein. The crude enzyme solution of Antarctic krill is obtained by enzymatic hydrolysis at 40° C. and pH 6.5 for 3 h. Then the Antarctic crude krill hydrolysate solution sequentially passed through an ultrafiltration membrane with a membrane pore molecular weight of 100 KDa and a membrane pore molecular weight of 50 KDa to obtain a protein hydrolysate with an average molecular weight of 50 KDa to 100 KDa.

Example 2

An antifreeze solution, the components are as follows (wt. %): 15% of 95% edible alcohol, 10% of propylene glycol, 2% of glycerol, 3% of sodium chloride, 1% of calcium chloride, 0.1% of glycine, 0.014% of Antarctic krill protein hydrolysate, 0.1% of the phospholipid, and the balance of water. The preparation method includes the following steps: firstly, 300 g of sodium chloride, 100 g of calcium chloride, 10 g of glycine and 10 g of phospholipid are dissolved with 6878.6 g of water, and then 1500 g of edible alcohol, 1000 g of propylene glycol, 200 g of glycerin and 1.4 g of Antarctic krill protein hydrolysate are added, and stirred uniformly to obtain an antifreeze solution. The obtained antifreeze solution has a freezing point of −25° C., with a good fluidity, and a viscosity of 46.8 mPa·S, which is lower in viscosity and less volatile than the ternary coolant invented by Zhiwei Zhu et al. [Chinese Patent 201210558113.4]. The freezing crystallization does not occur when the antifreeze solution is rapidly stirred at low temperatures.

Figure 3:
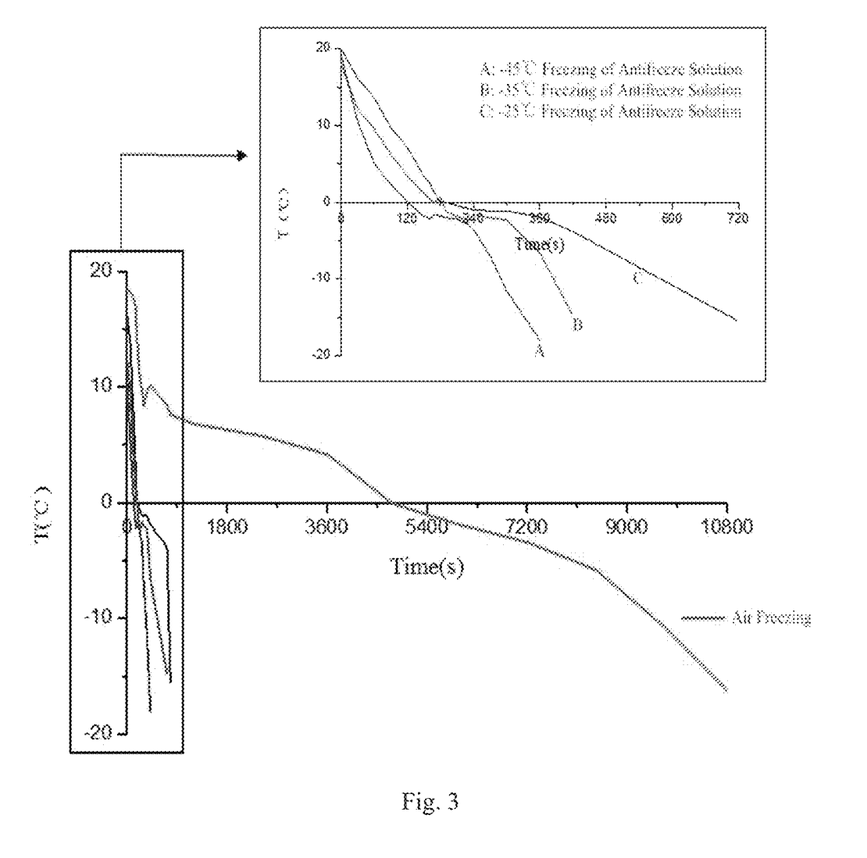
FIG. 3 is a freezing curve of fish pieces frozen at different temperatures.

The test found that (the freezing curve is shown in FIG. 3): when the fish pieces (4 cm×4 cm×4 cm, length×width×height) are frozen to a central temperature of −18° C., the antifreeze solution needs only 12.5 min to be frozen, while the flat air freezing takes more than 180 min. It can be indicated that the antifreeze solution of the present invention has a good freezing effect.

Example 3

An antifreeze solution, the components are as follows (wt. %): 20% of 95% edible alcohol, 15% of propylene glycol, 4% of glycerol, 4% of sodium chloride, 2% of calcium chloride, 0.12% of alanine, 0.30% of Antarctic krill protein hydrolysate, 0.15% of polysorbate-20, and the balance of water. The preparation method includes the following steps: firstly, 400 g of sodium chloride, 200 g of calcium chloride, 12 g of alanine and 15 g of polysorbate-20 are dissolved with 5443 g of water, and then 2000 g of edible alcohol, 1500 g of propylene glycol, 400 g of glycerin and 30 g of Antarctic krill protein hydrolysate are added, and stirred uniformly to obtain an antifreeze solution. The obtained antifreeze solution has a freezing point of −35° C. with a good fluidity, and a viscosity of 185 mPa·S. Compared with the quaternary coolant of Haijie Qin [Chinese Patent 201110174042.3], the present invention has less volatilization and low salt content, and has less corrosion to equipment. The freezing crystallization does not occur when the antifreeze is rapidly stirred at low temperatures.

The fish pieces (4 cm×4 cm×4 cm, length×width×height) are frozen to a central temperature of −18° C. The antifreeze solution of the present invention needs only 7.2 min to achieve this temperature, while the conventional flat air freezing requires more than 180 min. The freezing curve is shown in FIG. 3.

Example 4

An antifreeze solution, the components are as follows (wt. %): 25% of 95% edible alcohol, 20% of propylene glycol, 5% of glycerol, 6% of sodium chloride, 4% of calcium chloride, 0.15% of arginine, 0.18% of Antarctic krill protein hydrolysate, 0.12% of the phospholipid, 0.15% of the polysorbate-60, and the balance of water. The preparation method includes the following steps: firstly, 600 g of sodium chloride, 400 g of calcium chloride, 15 g of arginine, 12 g of the phospholipid and 15 g of polysorbate-60 are dissolved with 3940 g of water, and then 2500 g of edible alcohol, 2000 g of propylene glycol, 500 g of glycerin and 18 g of Antarctic krill protein hydrolysate are added, and stirred uniformly to obtain an antifreeze solution. The obtained antifreeze solution has a freezing point of −45° C., with a good fluidity, and a viscosity of 224.8 mPa·S. Compared with the freezing preservative solution of Linxin Zhang [Chinese Patent 201310653196.X], the present invention has a lower viscosity at the same temperature, a lower salt content, and less corrosion to equipment. The freezing crystallization does not occur when the antifreeze is rapidly stirred at low temperatures.

The fish pieces (4 cm×4 cm×4 cm, length×width×height) are frozen to a central temperature of −18° C. The antifreeze solution of the present invention needs only 6 min to achieve this temperature, while the conventional flat air freezing requires more than 180 min. The freezing curve is shown in FIG. 3.

Comparative Experiment 1

The components of antifreeze solution A containing the Antarctic krill protein hydrolysate are as follows (wt. %): 26% of 95% edible alcohol, 20% of propylene glycol, 5% of glycerol, 7% of sodium chloride, 3% of calcium chloride, 0.15% of arginine, 0.2% of the Antarctic krill protein hydrolysate, and the balance is water. The preparation method includes the following steps: firstly, 70 g of sodium chloride, 30 g of calcium chloride, and 1.5 g of arginine are dissolved with 386.5 g of water, and then 260 g of edible alcohol, 200 g of propylene glycol, 50 g of glycerin and 2 g of Antarctic krill protein hydrolysate are added, and stirred uniformly to obtain an antifreeze solution A.

The components of antifreeze solution B without the Antarctic krill protein hydrolysate are as follows (wt. %): 26% of 95% edible alcohol, 20% of propylene glycol, 5% of glycerol, 7% of sodium chloride, 3% of calcium chloride, 0.15% of arginine, and the balance is water. The preparation method includes the following steps: firstly, 70 g of sodium chloride, 30 g of calcium chloride, and 1.5 g of arginine are dissolved with 388.5 g of water, and then 260 g of edible alcohol, 200 g of propylene glycol, and 50 g of glycerin are added, and stirred uniformly to obtain an antifreeze solution B.

Figure 1:
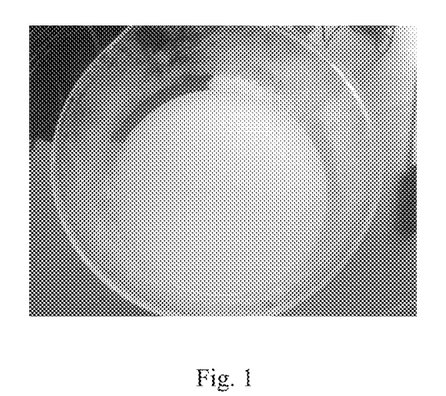
FIG. 1 is a picture of a first antifreeze solution containing an Antarctic krill protein hydrolysate.
Figure 2:
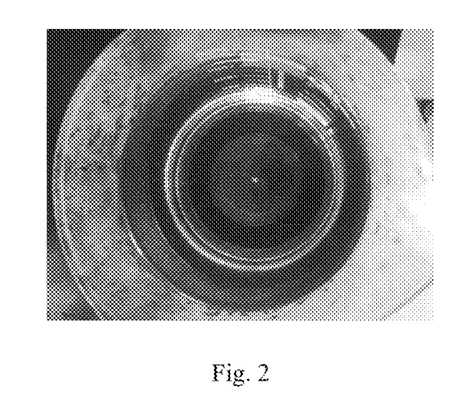
FIG. 2 is a picture of a second antifreeze solution without an Antarctic krill protein hydrolysate.

Both of the antifreeze solution A and B were placed at −80° C. to cool down. The antifreeze solution B without the Antarctic krill protein hydrolysate has a minimum freezing point of −45.6° C., and the solution crystallizes (FIG. 1), while the antifreeze solution A containing 0.2% Antarctic krill protein hydrolysate not only displays no crystallization, but also the minimum freezing point drops to −47° C.±1.2° C. (FIG. 2).

Comparative Example 2

The components of antifreeze solution C containing surfactant are as follows (wt. %): 25% of 95% edible alcohol, 20% of propylene glycol, 5% of glycerol, 6% of sodium chloride, 2% of calcium chloride, 0.15% of arginine, 0.2% of polysorbate-80, and the balance is water. The preparation method includes the following steps: firstly, 60 g of sodium chloride, 20 g of calcium chloride. 1.5 g of arginine, and 80 g of polysorbate-80 are dissolved with 416.5 g of water, and then 250 g of edible alcohol, 200 g of propylene glycol, and 50 g of glycerin are added, and stirred uniformly to obtain an antifreeze solution C.

The components of antifreeze solution D without surfactant are as follows (wt. %): 25% of 95% edible alcohol, 20% of propylene glycol, 5% of glycerol, 6% of sodium chloride, 2% of calcium chloride, and 0.15% of arginine, and the balance is water. The preparation method includes the following steps: firstly, 60 g of sodium chloride, 20 g of calcium chloride, and 1.5 g of arginine are dissolved with 418.5 g of water, and then 250 g of edible alcohol, 200 g of propylene glycol, and 50 g of glycerin are added, and stirred uniformly to obtain an antifreeze solution D.

The antifreeze solution C and D are placed at 4° C. for one month, and the weight of the two antifreeze solution is determined. After one month, the antifreeze solution D without surfactant has a volatilization rate of 16%, and the antifreeze solution C with surfactant has a volatilization rate of 12%.

Example 5

This embodiment provides a method of green and safe preservation of aquatic products at sea, which adopts the first device as shown in FIG. 4, and the antifreeze solution prepared according to the formulation of Example 4 is used as a main cold source.

The method is implemented as follows:

(1) 80% of the antifreeze solution is added into the cold storage tank 2. The on-board refrigeration system 1 is started, and the first valve 8 is opened. The three-way valve 16 is turned to make the self-circulation line 1 communicating. The first circulation pump 7 is started to make the antifreeze solution in the cold storage tank 2 in a flowing state. The coil 5 of the cold storage tank 2 exchanges heat with the on-board refrigeration system 1 for cooling, so that the temperature of the antifreeze solution of the cold storage tank 2 is kept between −10° C. to −40° C. Then the first circulation pump 7 is turned off and the first valve 8 is closed to cut the self-circulation line 1.

(2) The seawater is added into the cooling tank 3. The corresponding salt is added according to the required cold seawater temperature, and the formula is as follows: $T=-0.0636 \times C$, where T represents the temperature of the required cold seawater, and the unit is ° C.; C represents the salt content in seawater, and the unit is g/L. The valves 10, 12 are opened and the circulation pumps 9, 11 are started to make the second circulation line 3 and the third circulation line 4 communicating at the same time. The seawater in the cooling tank 3 and the antifreeze solution in the cold storage tank 2 exchange heat for cooling through the heat exchanger 6, so that the temperature of the seawater in the cooling tank 3 is reduced to 0° C. to −10° C. Then 2 tons of captured catches, such as mackerel, caught on board are transferred into the cooling tank 3 and contact the cold seawater at 0° C. to −10° C. After 30 min, the fish bodies are rapidly cooled, thereby making the temperatures of the centers of the fish bodies to be at −5° C. to 5° C. thus to meet a cooling requirement. During the cooling process, the communication states of the circulation line 3 and line 4 are kept to provide cooling for the captured catches.

(3) After the cooling is completed, the circulation pumps 9, 11 are turned off, and the valves 10, 12 are closed to cut the circulation line 3 and the line 4. The seawater in the cooling tank 2 is discharged through the seawater discharging port. Meanwhile the first valve 8 is opened, and the three-way valve 16 is turned to communicate the circulation line 2. The circulation pump 7 is started to let the antifreeze solution in the cold storage tank 2 flow into the coil 5 in the wall of the refrigeration house 4, so that the temperature of the refrigeration house 4 is lowered and kept at 0° C. to −10° C. After the seawater of the cooling tank 3 is drained, the captured catches are transferred to the refrigeration house 4 to maintain freshness.

The antifreeze solution is added to the cold storage tank via an antifreeze solution charging pipeline through the antifreeze solution charging port, and the antifreeze solution is discharged out of the cold storage tank 2 through the antifreeze solution discharging port by connecting an antifreeze solution discharge pipeline.

The temperature of the refrigeration house 4 is adjusted by the change of the output power of the circulation pump 7. When the flow rate of the antifreeze solution increases, the amount of cooling capacity inputting into the refrigeration house increases, and vice versa. The temperature of the refrigeration house is kept at 0° C. to −10° C.

Example 6

A method of green and safe preservation for aquatic products at sea, which adopts the same device to Example 5. The antifreeze solution prepared according to the following formula is used as the main cold source (wt. %): 24% of 95% edible alcohol, 25% of propylene glycol, 2% of glycerol, 4% of sodium chloride, 3% of calcium chloride, 0.15% of arginine, 0.15% of Antarctic krill protein hydrolysate, 0.35% of phospholipid, and balance of water. The freezing point of antifreeze solution is −48.8° C.

The implementation steps of the method are the same to those of the Example 5, and the difference is that the temperature of the seawater in the cooling tank 3 is lowered to 5° C. to −5° C. About 1 ton of captured catches, such as shrimp, caught on board are placed in the cooling tank 3, so that the fish bodies are rapidly cooled, thereby making the temperatures of the centers of the fish bodies to be at 0° C. to −5° C. to achieve cooling requirements.

Example 7

This embodiment provides a method of green and safe preservation for aquatic products at sea, which adopts the second device in FIG. 5. The antifreeze solution prepared according to the following formula is used as the main cold source (wt. %); 30% of 95% edible alcohol, 20% of propylene glycol, 3% of glycerol, 5% of sodium chloride, 2% of calcium chloride, 0.12% of arginine, 0.13% of Antarctic krill protein hydrolysate, 0.16% of phospholipid, 0.32% of polysorbate-80, and balance of water. The freezing point of antifreeze solution is −49.2° C.

The method is implemented as follows:

(1) The antifreeze solution is added from the antifreeze solution charging port into the second cold storage tank 2' through an antifreeze solution charging pipeline. The on-board refrigeration system 1 is started, the first valve 19 is opened, the three-way valve 23 is turned, the second valve 22 is opened, and the three-way valve 24 is turned to make the first circulation line 5 communicating, and the circulation pumps 18, 21 are started, so that the antifreeze solution in the first cold storage tank 2 and the second cold storage tank 2' is in a flowing state. The temperature of the antifreeze solution in the first cold storage tank 2 and the second cold storage tank 2' is lowered and kept at −45° C. to −18° C. in advance.

(2) One ton of the caught skipjack is placed in the cabin 17. The three-way valve 23 is turned to make the second circulation line 6 communicating, so that the low-temperature antifreeze solution goes into the coil 5 in the six walls of the cabin 17. Meanwhile, the three-way valve 24 is turned to make the communication line 7 communicating, so that the low-temperature antifreeze solution is added to the cabin 17 and the antifreeze solution makes direct contact with the captured catches. After the antifreeze solution submerges the fish, the circulation pump 21 is stopped, and the valve 22 is closed. The circulation pump 25 is started to circulate the antifreeze solution in the cabin 17. After about 40 min, the fish bodies are quickly cooled to the central temperature −15° C. to −25° C. for to meet the freezing requirement. Then the antifreeze solution in the cabin is discharged through the cooling solution discharge line. The skipjack continues to be stored in the cabin. The circulation line 6 between the first cold storage tank 2 and the cabin coil 5 is kept in a circulation state, so that the temperature in the cabin 17 is kept at −25° C. to −18° C. This greatly reduces the working intensity of fish transportation, and also effectively reduces the damage rate (1% to 5%) of the fish body. In addition, the fish can be stored in the on-board refrigerated cabin for a long time and kept high freshness.

After the antifreeze solution is reduced, the antifreeze solution is added into the second cold storage tank through the antifreeze solution charging port.

The temperature in the cabin is adjusted by the change of the output power of the circulation pump. When the flow rate of the antifreeze solution increases, the amount of cooling capacity inputting into the refrigeration house increases and vice versa.

Example 8

A method of green and safe preservation for aquatic products at sea, which adopts the same device to the Example 7. The antifreeze solution prepared according to the following formula is used as the main cold source (wt. %): 26% of 95% edible alcohol, 22% of propylene glycol, 5% of glycerol, 7% of sodium chloride, 2% of calcium chloride, 0.10% of arginine, 0.22% of Antarctic krill protein hydrolysate, 0.13% of phospholipid, 0.13% of polysorbate-20, and balance of water. The freezing point of antifreeze solution is −50.4° C.

The implementation steps of the method are the same as those in the Example 7. The difference is that 1 ton of freshly caught shrimp is placed in the cabin (17), and the unfrozen solution is submerged and circulated. After about 30 minutes, the fish body is quickly cooled to a central temperature of −15° C. to meet the cooling requirements.

The method greatly reduces the working intensity of the shrimp transportation, and also effectively reduces the damage rate (1% to 5%) of the shrimp body. In addition, the fish can be stored in the on-board refrigerated cabin for a long time and kept high freshness.

Example 9

A method of green and safe preservation for aquatic products at sea, which adopts the third device in FIG. 6. The antifreeze solution prepared according to the following formula is used as the main cold source (wt. %): 24% of 95% edible alcohol, 24% of propylene glycol, 3% of glycerol, 6% of sodium chloride, 40 of calcium chloride, 0.15% of arginine, 0.26% of Antarctic krill protein hydrolysate, 0.30% of polysorbate-20, and balance of water. The freezing point of antifreeze solution is −49.8° C.

The method is implemented as follows:

(1) The antifreeze solution is added to the cold storage tank 2. The on-board refrigeration system 1 is started, and the valve 30 is opened. The three-way valve 37 is turned to connect the circulation line 9, and the circulation pump 29 is started, so that the antifreeze solution in the cold storage tank 2 is in a flowing state. The coil 5 in the cold storage tank 2 exchanged cooling capacity with the refrigeration system 1, so that the temperature of the antifreeze solution in the cold storage tank 2 is kept at −45° C. to −25° C.;

(2) The captured 1 ton of skipjack is placed into a horizontal (or vertical) plate freezer. The circulation pump 29 is shut down, and the valve 30 is closed. The valve 32, 33 or 34 and 36 or 35 is opened, and the circulation pump 31 is started. Then the low-temperature antifreeze solution goes into the interlayer of the horizontal or vertical plate freezer plate for indirect heat exchange. The high-temperature antifreeze solution flows out of the freezing machine from the side of the interlayer to return to the cold storage tank 2. At the same time, the skipjack in the plate freezer is quickly cooled to a central temperature of −15° C. and meet the cooling requirements.

(3) After the plate freezing is finished, the three-way valve 37 is turned to connect the circulation line 10. The valve 30 is opened, and the pump 29 is started, so that the low-temperature antifreeze solution flows into the coil 5 around the wall of the refrigeration house 4. The temperature of the refrigeration house 4 is reduced and kept at −18° C. ±2° C. Meanwhile, the pump 31 is shut down, and the valve 33 or 34 and 36 or 35 are closed, the skipjack is transferred from the freezer to the refrigeration house 4 to maintain its freshness.

The indirect heat exchange in the plate freezer can adjust the freezing rate of the fish by adjusting the flow rate of the antifreeze solution by the circulation pump.

The antifreeze solution in the cold storage tank is added to the cold storage tank through the antifreeze solution charging port, and is discharged from the antifreeze solution discharging port of the cold storage tank.

The temperature of the refrigeration house is adjusted by the change of the output power of the circulation pump. When the flow rate of the antifreeze solution increases, the amount of cooling capacity inputting into the refrigeration house increases, and vice versa.

Example 10

This embodiment provides a method of green and safe preservation for aquatic products at sea, which adopts the same device to the Example 9. The antifreeze solution prepared according to the following formula is used as the main cold source (wt. %): 21% of 95% edible alcohol, 26% of propylene glycol, 2% of glycerol, 8% of sodium chloride, 2% of calcium chloride, 0.12% of arginine, 0.22% of Antarctic krill protein hydrolysate, 0.35% of phospholipid, and balance of water. The freezing point of antifreeze solution is −48.2° C.

The method is carried out in the same way as in the Example 9, and the difference is that the fish is 1 ton of captured trout.

What is claimed is:

1. A method for preserving aquatic products at sea, comprising the following steps:
providing a device comprising a cold storage tank for receiving an antifreeze solution, a cooling unit for holding fish bodies from a catch, a circulation line connecting the cold storage tank to the cooling unit, and an on-board refrigeration system for circulating the antifreeze solution via the circulation line from the cold storage tank to the cooling unit;
circulating the antifreeze solution added to the cold storage tank from the cold storage tank to the cooling unit via the circulation line by an on-board refrigeration system to decrease temperatures at centers of fish bodies rapidly to achieve rapid cooling, reduce activity of endogenous enzymes, and inhibit proliferation of microorganisms by direct contact between the antifreeze solution and fish bodies by submerging fish bodies in the cooling unit in the antifreeze solution or indirect contact between the antifreeze solution and the fish bodies through circulating the antifreeze solution in a wall of the cooling unit holding the fish bodies;
wherein the antifreeze solution consists of edible alcohol, propylene glycol, glycerin, calcium chloride, sodium chloride, amino acid, Antarctic krill protein hydrolysate with an average molecular weight of 50-100 KDa, surfactant, and water; wherein the surfactant is one or mixture of phospholipid, polysorbate-20, polysorbate-60, and polysorbate-80; and wherein each component of the antifreeze solution is food grade, and the mass percentage of each component is as follows:

| | |
|---|---|
| edible alcohol | 15%-30% |
| propylene glycol | 10%-30% |
| glycerol | 2%-15% |
| calcium chloride | 1%-10% |
| sodium chloride | 3%-10% |
| amino acid | 0.1%-0.15% |
| Antarctic krill protein hydrolysate | 0.01%-0.3% |
| surfactant | 0.005%-0.5% |
| water | balance. |

2. The method according to claim 1, wherein
an enzymatic hydrolysis with papain hydrolyzes Antarctic Krill to obtain an Antarctic krill crude protein hydrolysate solution, wherein the solution is sequentially passing through an ultrafiltration membrane with membrane pore molecular weight of 100 KDa to 50 KDa to obtain the protein hydrolysate with an average molecular weight of 50 KDa to 100 KDa.

3. The method according to claim 1, wherein the amino acid is selected from the group consisting of glycine, alanine, and arginine.

4. The method according to claim 1, wherein the propylene glycol has a mass percentage of 10%-20%, and the glycerin has a mass percentage of 2%-5%, and the calcium chloride has a mass percentage of 1%-5%.

5. The method according to claim 1, wherein the cooling unit comprises a cooling tank or an on-board refrigeration house; wherein the device further comprises a heat exchanger; wherein both a wall of the cold storage tank and a wall of the on-board refrigeration house are provided with a coil; wherein a circulation line comprises a self-circulation line, a first circulation line, a second circulation line, or a third circulation line; wherein the self-circulation line controlled by a first valve and a first circulation pump is formed at the cold storage tank, the first circulation line controlled by the first valve and the first circulation pump is formed between the coil of the on-board refrigeration house and the cold storage tank, the second circulation line controlled by a valve and a circulation pump is formed between the cold storage tank and the heat exchanger, the third circulation line controlled by a third valve and a third circulation pump is formed between the cooling tank and the heat exchanger; and wherein the method includes the following steps:
- (1) the antifreeze solution is added into the cold storage tank, the on-board refrigeration system is started, the first valve is opened to make the self-circulation line communicating, the first circulation pump is started to make the antifreeze solution flow in the cold storage tank, the coil of the cold storage tank and the on-board refrigeration system exchange heat for cooling, so that a temperature of the antifreeze solution in the cold storage tank is kept between −45° C. to −10° C., and then the self-circulation line is disconnected;
- (2) the cooling tank is added with seawater, a salt content in the seawater is adjusted according to an empirical formula and a required temperature of cold seawater, the empirical formula is T=−0.0636×C, where T represents the required temperature of cold seawater, and the unit is ° C.; C represents the salt content in seawater, the unit is g/L; the second and third valves are opened and the second and third circulation pumps are started to make the second circulation line and the third circulation line communicating at the same time, so that the seawater in the cooling tank and the antifreeze solution in the cold storage tank exchange heat for cooling through the heat exchanger, so that a temperature of the seawater in the cooling tank is reduced to 0° C. to −10° C.; then the catch is transferred into the cooling tank and contact the cold seawater at 0° C. to −10° C. to cool the fish bodies quickly, making the temperatures of the centers of the fish bodies to be at −5° C. to 5° C. thus to meet a cooling requirement; and during a cooling process, the communication of the second circulation line and the communication of the third circulation line is kept to provide cooling for the catch; and
- (3) after the cooling process is completed, the second circulation line and the third circulation line are disconnected, and the seawater in the cooling tank is discharged through the seawater discharging port, the first valves is opened to make the first circulation line communicating at the same time, and the first circulation pump is started to make the antifreeze solution in the cold storage tank flow into the coil in the wall of the on-board refrigeration house, so that a temperature of the on-board refrigeration house is lowered and kept at 0° C. to −10° C., and after the seawater in the cooling tank is drained, the catch is transferred to the on-board refrigeration house to maintain freshness.

6. The method according to claim 5, wherein a filter is further arranged between the cooling tank and the heat exchanger, and wherein the third valve, the filter, and the third circulation pump are sequentially arranged in a flowing direction from the cooling tank to the heat exchanger.

7. The method according to claim 1, wherein the cold storage tank comprises a first cold storage tank and a second cold storage tank, the cooling unit comprises a cabin, and both a wall of the first cold storage tank and a wall of the cabin are provided with a coil; wherein the circulation line further comprises a first circulation line, a second circulation line, a communication line, or a self-circulation line; wherein the first circulation line controlled by first and second valves and first and second circulation pumps is formed between the first cold storage tank and the second cold storage tank, the second circulation line controlled by the first valve and the first circulation pump is formed between the first cold storage tank and the coil of the cabin, and the communication line is formed between the second cold storage tank and the cabin by the second valve and the second circulation pump, the self-circulation line controlled by a third circulation pump is formed at the cabin, and wherein the method includes the following steps:
- (1) the antifreeze solution is added into the second cold storage tank, the on-board refrigeration system is started, and the first and second valves are opened to make the first circulation line communicating so that the antifreeze solution is in a flowing state between the first cold storage tank and the second cold storage tank, the coil of the first cold storage tank and the on-board refrigeration system exchange heat for cooling, and a temperature of the antifreeze solution in the first cold storage tank and the second cold storage tank is decreased and kept at −45° C. to −18° C.; and
- (2) a catch is put into the cabin, the first valve is opened to make the second circulation line communicating, the first circulation pump is started to make the antifreeze solution in the first cold storage tank flow into the coil of the cabin, the second valve is opened to make the communication line communicating at the same time so that the antifreeze solution in the second cold storage tank is added to the cabin and the antifreeze solution makes direct contact with the catch, after the antifreeze solution submerges the catch, the second circulation pump is turned off to disconnect the communication line, and then the third circulation pump is started to make the self-circulation line communicating, the flowing antifreeze solution allows the fish body to be rapidly cooled, making the temperatures of the centers of the fish bodies to be at −15° C. to −25° C. thus to meet a cooling requirement, after the cooling is completed, the antifreeze solution in the cabin is discharged, the catch is still stored in the cabin, the second circulation line between the first cold storage tank and the coil of the cabin is kept in a circulating state, so that the temperature in the cabin is kept at −45° C. to −18° C. to reach a frozen storage condition.

8. The method according to claim 7, wherein the device further comprises a filter that is arranged between the third circulation pump and the cabin in the self-circulation line, allowing a flow of liquid in the communication process.

9. The method according to claim 1, wherein the cooling unit comprises a plate freezer or a refrigeration house and both a wall of the cold storage tank and a wall of the refrigeration house is provided with a coil; wherein the device further comprises a self-circulation line, a first circulation line, or a second circulation line, the self-circulation line controlled by a first valve and a first circulation pump is formed at the cold storage tank, the first circulation line controlled by the first valve and the first circulation pump is formed between the coil of the refrigeration house and the cold storage tank, the second circulation line controlled by valves and a second circulation pump is formed between the cold storage tank and the plate freezer; and wherein the method includes the following steps:

(1) antifreeze solution is added into the cold storage tank, the on-board refrigeration system is started, and the valve is opened to make the first circulation line communicating, the first circulation pump is started to make the antifreeze solution in the cold storage tank in a flowing state, the cold exchange is carried out through the coil and the on-board refrigeration system, so that a temperature of the antifreeze solution in the cold storage tank is kept at −45° C. to −20° C., and then the self-circulation line is disconnected;

(2) the catch is put into the plate freezer, the valve is opened to make the second circulation line communicating, and the second circulation pump is started to make the low temperature antifreeze solution go into an interlayer of the plate freezer plate for indirect heat exchange, the high-temperature antifreeze solution after heat exchange flows out of the plate freezer from the side of the interlayer and returns to the cold storage tank, at the same time, the catch in the plate freezer is rapidly frozen, making the temperatures of the centers of the fish bodies to be at −10° C. to −18° C. thus to meet a cooling requirement; and (3) after the plate freezing is finished, the second circulation line is disconnected, at the same time, the first valve is opened to communicate the first circulation line, and the first circulation pump is started to make the low-temperature antifreeze solution flow into the coil of the wall of the refrigeration house, so that the temperature of the refrigeration house is lowered and kept below −18° C., and the catch is then transferred from the plate freezer to a refrigeration house to maintain freshness.

* * * * *